United States Patent
Moller et al.

(10) Patent No.: US 10,351,455 B2
(45) Date of Patent: Jul. 16, 2019

(54) BIOCHAR WATER TREATMENT

(71) Applicant: University of Idaho, Moscow, ID (US)

(72) Inventors: Gregory Moller, Moscow, ID (US); Daniel Strawn, Moscow, ID (US)

(73) Assignee: University of Idaho, Moscow, ID (US)

(*) Notice: Subject to any disclaimer, the term of this patent is extended or adjusted under 35 U.S.C. 154(b) by 996 days.

(21) Appl. No.: 14/549,342

(22) Filed: Nov. 20, 2014

(65) Prior Publication Data
US 2015/0144564 A1   May 28, 2015

Related U.S. Application Data

(60) Provisional application No. 61/908,624, filed on Nov. 25, 2013.

(51) Int. Cl.
*C02F 1/28* (2006.01)
*C02F 1/52* (2006.01)
(Continued)

(52) U.S. Cl.
CPC ............... *C02F 9/00* (2013.01); *B01J 20/20* (2013.01); *B01J 20/3204* (2013.01);
(Continued)

(58) Field of Classification Search
CPC ...................................................... C02F 1/283
See application file for complete search history.

(56) References Cited

U.S. PATENT DOCUMENTS 3,876,451 A    4/1975  Zall
5,660,142 A *  8/1997  Van Rijn ............. A01K 63/04
                                                         119/225
(Continued)

FOREIGN PATENT DOCUMENTS

CH    705 920       6/2013
EP    2 284 141     2/2011
(Continued)

OTHER PUBLICATIONS

Yao et al., Engineered Biochar Reclaiming Phosphate from Aqueous Solutions: Mechanisms and Potential Application as a Slow-Release Fertilizer, Jul. 13, 2013, Environmental Science and Technology, vol. 47, pp. 8700-8708 (Year: 2013).*
(Continued)

*Primary Examiner* — Bobby Ramdhanie
*Assistant Examiner* — Michael J An
(74) *Attorney, Agent, or Firm* — Klarquist Sparkman, LLP

(57) ABSTRACT

Disclosed herein are embodiments of a system for treating water. The system comprises a biochar inlet, and optionally a metal salt inlet, ozone inlet, organic carbon compound inlet or any combination thereof. The biochar may be produced by biomass pyrolysis and the pyrolysis may be coupled to energy generation. The system also comprises a filtration device, such as a reactive filtration device. The system produces a treated water stream and a reject stream, which may be further separated into a recycled water stream and a solid product. The solid product may be suitable as a soil amendment for application to agricultural land, or for recycling. A method for using the system to treat water also is disclosed.

24 Claims, 4 Drawing Sheets

(51) Int. Cl.

| | |
|---|---|
| *C02F 9/00* | (2006.01) |
| *B01J 20/20* | (2006.01) |
| *B01J 20/32* | (2006.01) |
| *C05F 11/02* | (2006.01) |
| *C02F 103/00* | (2006.01) |
| *C02F 101/10* | (2006.01) |
| *C02F 101/30* | (2006.01) |
| *C02F 1/72* | (2006.01) |
| *C02F 1/78* | (2006.01) |

(52) U.S. Cl.
CPC .......... *B01J 20/3236* (2013.01); *C02F 1/283* (2013.01); *C05F 11/02* (2013.01); *B01J 2220/4812* (2013.01); *C02F 1/52* (2013.01); *C02F 1/722* (2013.01); *C02F 1/78* (2013.01); *C02F 2101/105* (2013.01); *C02F 2101/30* (2013.01); *C02F 2101/305* (2013.01); *C02F 2103/001* (2013.01); *Y02E 50/30* (2013.01); *Y02E 50/343* (2013.01); *Y02P 20/136* (2015.11); *Y02W 30/47* (2015.05)

(56) References Cited

U.S. PATENT DOCUMENTS

| | | | | |
|---|---|---|---|---|
| 5,843,308 | A | * | 12/1998 | Suozzo ................ B01D 24/30 |
| | | | | 210/195.1 |
| 6,015,496 | A | * | 1/2000 | Khudenko .............. C02F 3/006 |
| | | | | 210/603 |
| 6,379,555 | B1 | | 4/2002 | Targosz |
| 6,426,005 | B1 | * | 7/2002 | Larsson .............. B01D 24/007 |
| | | | | 210/252 |
| 6,770,205 | B1 | | 8/2004 | Schroder et al. |
| 7,399,416 | B2 | | 7/2008 | Möller et al. |
| 7,445,721 | B2 | | 11/2008 | Möller |
| 7,658,853 | B2 | | 2/2010 | Vignola et al. |
| 7,713,423 | B2 | | 5/2010 | Möller et al. |
| 7,713,426 | B2 | | 5/2010 | Newcombe |
| 7,744,764 | B2 | | 6/2010 | Möller et al. |
| 7,884,043 | B2 | | 2/2011 | Lisetskiy et al. |
| 8,071,055 | B2 | | 12/2011 | Newcombe |
| 8,080,163 | B2 | | 12/2011 | Möller et al. |
| 8,512,659 | B2 | | 8/2013 | Li et al. |
| 8,541,331 | B2 | | 9/2013 | Li et al. |
| 2004/0144728 | A1 | | 7/2004 | Möller et al. |
| 2005/0074380 | A1 | * | 4/2005 | Boren ................... B01J 19/006 |
| | | | | 423/1 |
| 2010/0282654 | A1 | * | 11/2010 | Hauschild ............ C02F 3/1268 |
| | | | | 210/151 |
| 2012/0261357 | A1 | * | 10/2012 | Larsson .............. B01D 24/007 |
| | | | | 210/786 |
| 2013/0203144 | A1 | * | 8/2013 | Josse ....................... C02F 11/04 |
| | | | | 435/167 |

FOREIGN PATENT DOCUMENTS

| | | |
|---|---|---|
| RU | 2410337 | 6/2010 |
| WO | WO 2011/097183 | 8/2011 |
| WO | WO 2012/095119 | 7/2012 |
| WO | WO 2013/126477 | 8/2013 |

OTHER PUBLICATIONS

Chen et al., "A novel magnetic biochar efficiently sorbs organic pollutants and phosphate," *Bioresource Technology*, 102: 716-723, 2011.
Gu et al., "Preparation and Evaluation of GAC-Based Iron-Containing Adsorbents for Arsenic Removal," *Environmental Science & Technology*, 39: 3833-3843, 2005.
Reed et al., "As(III), As(V), Hg, and Pb Removal by Fe-Oxide Impregnated Activated Carbon," *Journal of Environmental Engineering*, 126:869-873, 2000.

Vaughan et al., "Modeling As(V) removal by a iron oxide impregnated activated carbon using the surface complexation approach," *Water Research*, 39:1005-14, 2005.
Zhang et al., "A method for preparing ferric activated carbon composites adsorbents to remove arsenic from drinking water," *Journal of Hazardous Materials*, 148:671-678, 2007.
Liu et al., "Removing phosphorus from aqueous solutions by using iron-modified corn straw biochar," *Frontiers of Environmental Science and Engineering*, pp. 1-10, Jan. 21, 2015.
Payne et al., "Adsorption of Arsenate and Arsenite by Iron-Treated Activated Carbon and Zeolites: Effects of pH, Temperature, and Ionic Strength," *Journal of Environmental Science and Health* 40:723-749, 2005.
Babenkov et al., "Ochistka vody koagulyantami. Moskva, Nauka", pp. 236-242, 294-297, 312, 1977.
Chen et al., "A novel magnetic biochar efficiently sorbs organic pollutants and phosphate," *Bioresource Tech.* (2011) 102(2):716-723, Sep. 21, 2010.
Chintala et al., "Nitrate sorption and desorption in biochars from fast pyrolysis," *Microporous and Mesoporous Materials*, (2013) 179(15):250-257, Jun. 14, 2013.
Dodds et al., "Eutrophication of U.S. Freshwaters: Analysis of Potential Economic Damages," *Environmental Science & Technology* 43(1):12-19, Nov. 12, 2008.
Gu et al., "Preparation and evaluation of GAC-based iron-containing adsorbents for arsenic removal," *Environmental Science & Technology* 39(10):3833-3843, Apr. 15, 2005.
Hale et al., "The sorption and desorption of phosphate-P, ammonium-N and nitrate-N in cacao shell and corn cob biochars," *Chemosphere* 91(11):1612-1619, Jan. 29, 2013.
Kolodynska, "Kinetic and adsorptive characterization of biochar in metal ions removal," *Chemical Engineering Journal* 197:295-305, May 18, 2012.
Maddox, "The promise [and uncertainties] of Biochar," CSA News Magazine 58:4-9, Sep. 2, 2013.
Moussavi and Khosravi, "Preparation and characterization of a biochar from pistachio hull biomass and its catalytic potential for ozonation of water recalcitrant contaminants," *Bioresource Technology* 119:66-71, May 29, 2012.
Reed et al., "As(III), As(V), Hg, and Pb Removal by Fe-Oxide Impregnated Activated Carbon," *ASCE Journal of Environmental Engineering* 126(9):869-874, Sep. 1, 2000.
Sánchez-Polo et al., "Efficiency of activated carbon to transform ozone into .OH radicals: Influence of operational parameters," *Water Research* 39(14): 3189-3198, Jul. 11, 2005.
Sneath et al., "Assessment of biochar and iron filing amendments for the remediation of a metal, arsenic and phenanthrene co-contaminated spoil," *Environmental Pollution* 178:361-366, Mar. 1, 2013.
Taghizadeh-Toosi et al., "Biochar adsorbed ammonia is bioavailable," *Plant Soil* (2012) 350(1-2):57-69, Jul. 6, 2011.
United States Environmental Protection Agency, "National Rivers and Streams Assessment 2008-2009," Feb. 28, 2013.
United States Geological Survey, "Mineral Commodity Summaries 2013," Jan. 24, 2013.
Vaughan et al., "Modeling As(V) removal by a [sic] iron oxide impregnated activated carbon using the surface complexation approach," *Water Research* 39(6):1005-1014, Feb. 25, 2005.
Yao et al., "Removal of phosphate from aqueous solution by biochar derived from anaerobically digested sugar beet tailings," *Journal of Hazardous Materials* 190:501-507, Mar. 29, 2011.
Yao et al., "Engineered Biochar Reclaiming Phosphate from Aqueous Solutions: Mechanisms and Potential Application as a Slow-Release Fertilizer," *Environmental Science & Technology* 47: 8700-8708, Jul. 13, 2013.
Zhang et al., "A method for preparing ferric activated carbon composites adsorbents to remove arsenic from drinking water," *Journal of Hazardous Materials* 148(3):671-678, Mar. 12, 2007.
Zhang et al., "Preparation and characterization of a novel magnetic biochar for arsenic removal," *Bioresource Technology* (2013) 130:457-462, Dec. 8, 2012.

(56) References Cited

OTHER PUBLICATIONS

Zhang et al., "Removal of arsenic, methylene blue, and phosphate by biochar/AlOOH nanocomposite," *Chemical Engineering Journal* 226:286-292, Apr. 28, 2013.
International Search Report dated Mar. 5, 2015 from International Application No. PCT/US2014/066677.
Written Opinion dated Mar. 5, 2015 from International Application No. PCT/US2014/066677.
Atkinson et al., "Potential mechanisms for achieving agricultural benefits from biochar application to temperate soils: a review," *Plant Soil* 337:1-18, 2010.
Boki et al., "Phosphate Removal by Adsorption to Activated Carbon," *Nippon Eiseigaku Zasshi (Japanese Journal of Hygiene)* 42(3):710-720, 1987-1988.
Cao et al., "Properties of dairy-manure-derived biochar pertinent to its potential use in remediation," *Bioresource Technology* 101:5222-5228, 2010.
Clark et al., "Development of a Ct equation for the inactivation of *Cryptosporidium* oocysts with ozone," *Water Research* 36:3141-3149, 2002.
Ding et al., "Inactivation of Template-Directed Misfolding of Infectious Prion Protein by Ozone," *Applied and Environmental Microbiology* 78(3):613-620, 2012.
Downie, "Biochar Production and Use: Environmental Risks and Rewards," *Doctoral Thesis*, 2011.
Fierro et al., "Arsenic removal by iron-doped activated carbon prepared by ferric chloride forced hydrolysis," *Journal of Hazardous Materials* 168:430-437, 2009.
Jang et al., "Preloading Hydrous Ferric Oxide into Granular Activated Carbon for Arsenic Removal," *Environmental Science & Technology* 42:3369-3374, 2008.
Mondal et al., "Effects of adsorbent dose, its particle size and initial arsenic concentration on the removal of arsenic, iron and manganese from simulated ground water by $Fe^{3+}$ impregnated active carbon," *Journal of Hazardous Materials* 150:695-702, 2008.
Peterson et al., "Increasing biochar surface area: Optimization of ball milling parameters," *Powder Technology* 228:115-120, 2012.
Rakness et al., "Cryptosporidium Log-inactivation with Ozone Using Effluent $CT_{10}$, Geometric Mean $CT_{10}$, Extended Integrated $CT_{10}$ and Extended CSTR Calculations," *Ozone: Science and Engineering* 27:335-350, 2005.
Rutala et al., "Guideline for Disinfection and Sterilization in Healthcare Facilities, 2008," *Centers for Disease Control and Prevention*, available at http://www.cdc.gov/infectioncontrol/guidelines/disinfection/ and downloaded on Oct. 26, 2017.
Smith et al., "Methods for preparing synthetic freshwaters," *Water Research* 36:1186-1296, 2002.
Sreenivasulu et al., "Phosphate adsorption studies using carbon prepared from stem bark of *Eucalyptus teriticornis* Smith," *Indian Journal of Chemical Technology*, 6:256-262, Sep. 1999.
Uchimiya et al., "Contaminant immobilization and nutrient release by biochar soil amendment: Roles of natural organic matter," *Chemosphere* 80:935-940, 2010.
United States Environmental Protection Agency, "Disinfection Profiling and Benchmarking Guidance Manual," EPA 815-R-99-013, Aug. 1999.
United States Environmental Protection Agency, "2012 Guidelines for Water Reuse," EPA/600/R-12/618, Sep. 2012.
United States Environmental Protection Agency, "National Primary Drinking Water Regulations: Revisions to the Total Coliform Rule; Final Rule," *Federal Register* vol. 78, No. 30, Feb. 13, 2013.
Zhang et al., "Removal of Arsenic(V) from Aqueous Solutions Using Iron-Oxide-Coated Modified Activated Carbon," *Water Environmental Research* 79(8):931-936, Aug. 2007.
Meng et al., "Physicochemical properties of biochar produced by aerobically composted swine manure and its potential use as an environmental amendment," *Bioresource Technology* 142:641-646, May 29, 2013.

\* cited by examiner

FIG. 2 – PRIOR ART

BIOCHAR WATER TREATMENT

CROSS REFERENCE TO RELATED APPLICATION

This application claims the benefit of the earlier filing date of U.S. provisional patent application No. 61/908,624, filed Nov. 25, 2013, which is incorporated herein by reference in its entirety.

ACKNOWLEDGMENT OF GOVERNMENT SUPPORT

This invention was made with government support under IDA01457 awarded by United States Department of Agriculture Regional Research Hatch Project. The government has certain rights in the invention.

FIELD

Certain disclosed embodiments concern a system for water treatment comprising biochar addition and a method for using the system to treat water.

BACKGROUND

The impact of nutrient pollution from phosphorus and nitrogen on the nation's waters is significant. The estimated annual cost of nutrient pollution in the United States in freshwater is greater than $2.2 billion. The U.S. Environmental Protection Agency (EPA) found that about 40% of stream miles in the United States had elevated phosphorus levels and 27% had elevated nitrogen levels. The National Centers for Coastal Ocean Science (NCCOS) has estimated that nutrient pollution has had a moderate to high impact in 65% of the coastal areas observed.

Phosphorus is required for life. Increasing human population is driving increasing demand for food, fiber, biofuel and other agricultural products. Phosphorus is a key soil nutrient in agriculture and is necessary to sustain plant and animal growth. Intensive agriculture requires the input and replacement of nutrient phosphorus, as crop harvesting removes soil phosphorus and food or fiber distribution transports it from the local ecosystem. Phosphate that is returned to soil as a fertilizer or other additive is mined from the Earth's finite phosphorus mineral reserves or replaced by land application of manures or treated human waste. The United States Geological Survey, Mineral Commodity Summaries, 2013, reported world phosphorus mine production and reserves at 67 billion tons, and there are concerns that global phosphorus demand will outstrip supplies within the next 50 to 200 years.

SUMMARY

In view of the above, there is a need for a process that can provide an economical approach to recycling and reusing phosphorus for increased sustainability. There is also a need for a process that can remove other contaminants from wastewater, including trace organic compounds, hormones, antibiotics and pathogens. Disclosed herein are embodiments of a system and method for water treatment that address these needs. In some embodiments, the system comprises a fluid flow pathway, comprising a wastewater inlet for introducing a wastewater stream to the pathway, a biochar inlet for introducing biochar to the pathway, and a reactor. The system further comprises a filter downstream of the reactor and biochar inlet, the filter fluidly coupled to the fluid flow pathway; a treated water outlet fluidly coupled to the filter; and a reject stream outlet fluidly coupled to the filter. In some embodiments, the biochar inlet is upstream of the reactor. The fluid flow pathway may also comprise a metal salt inlet for introducing a metal salt to the fluid flow pathway. In some embodiments, both the biochar inlet and the metal salt inlet are upstream of the reactor. In alternative embodiments, one of the biochar inlet and metal salt inlet is upstream of the reactor, and the other inlet is downstream of the reactor. The fluid flow pathway may further comprise an oxidant inlet, such as an ozone inlet, an organic carbon compound inlet or a combination thereof.

In some embodiments, the biochar is a composition comprising a pyrolyzed biomass biochar, a hydrothermal carbonization-produced biomass biochar, or a combination thereof. The biomass may be selected from agricultural crop waste, forestry waste, algae, animal or human waste, industrial waste, municipal waste, anaerobic digester waste, plant materials grown for the production of biomass, or a combination thereof. In some embodiments, the biochar is a powdered solid, granules, pulverized solid, or fluid slurry, and in certain examples, the biochar further comprises a metal salt solution.

In some embodiments, the metal salt is a metal salt concentrate, metal salt solution, metal salt powder, metal salt granule, metal salt slurry or metal salt suspension. The metal salt may comprise iron, aluminum, calcium, magnesium, manganese, zinc, copper or a combination thereof, and in some examples, the metal salt comprises ferrous or ferric cations, ferrate anions, or a combination thereof. In particular embodiments, the metal salt comprises ferric chloride.

In some embodiments, the reactor is a reactor that agitates a fluid in the fluid flow pathway, generates or increases turbulence within the fluid, or a combination thereof. In certain embodiments, the reactor is a plug flow reactor, and may be a serpentine plug flow pipe reactor.

The filter may be a moving bed filter, moving bed reactive filter, continuously moving bed filter, a continuously moving bed reactive filter, a cycled backwash, fluidized bed, agitated bed, horizontal flow bed of the filter substrate, membrane filter, disk filter, cloth filter or combinations thereof. The filter may comprise a filtration substrate selected from natural minerals, synthetic minerals, polymeric beads, plastic beads, carbonaceous substrates or combinations thereof. In some embodiments, the filtration substrate is sand, garnet sand, anthracite coal or a combination thereof, and in certain embodiments, the filter is a continuously moving bed reactive sand filter.

In some embodiments, the system further comprises a solids separator fluidly coupled to the reject stream outlet, and in some examples, the solids separator further comprises a recycled water outlet and a solids outlet, and the solids outlet may output a solid suitable for recycling or application to agricultural land. The solids separator may comprise a settling basin, mesh filter, membrane filter, cloth filter, sand filter, rotating mat filter, chemical coagulator, polymer addition, centrifugal force separator, sieve, magnetic separator, plate clarifier, basin clarifier, coalescence separator or a combination thereof.

The system may further comprise an energy generator, which generates energy by biomass pyrolysis. The biomass pyrolysis may produce biochar suitable for use in the system. The energy generator may also generate heat, steam, syngas or a combination thereof.

A method for treating water is also disclosed. In some embodiments, the method comprises adding biochar to a wastewater stream that comprises at least one contaminant, and separating the biochar and at least one contaminant from the wastewater stream, to produce a treated water stream and a reject stream. The method may further comprise adding a metal salt, ozone, an organic carbon compound, or any combination thereof, to the wastewater stream. Separating the biochar and at least one contaminant from the wastewater stream may comprise filtering the wastewater stream comprising the biochar and at least one contaminant using a filter. The biochar may be added to the wastewater stream in an amount from 1 milligram to 2 grams per gallon of wastewater, or from 5 milligrams to 1 gram per gallon of wastewater. The metal salt may be added to the wastewater in an amount of from greater than zero to 100 milligrams per liter of wastewater.

In some embodiments, the wastewater stream is mixed with the biochar and/or metal salt in a reactor. The reactor may agitate the wastewater stream, generate or increase turbulence within the wastewater stream, or a combination thereof, and in some examples, the reactor is a plug flow reactor, and in certain examples, the reactor is a serpentine plug flow pipe reactor.

The method may further comprise separating the reject stream into a recycled water stream and a solid by-product, which may be suitable for recycling or application to agricultural, silvicultural, residential, commercial, or municipal land or horticultural soil containers. The method may further comprise pelletizing the solid by-product.

In some examples, the method further comprises pyrolyzing a biomass to generate biochar, and the pyrolysis may also generate heat, steam, syngas or a combination thereof.

In certain embodiments, the method further comprises testing the wastewater stream to determine an amount of the at least one contaminant present in the wastewater stream, and adjusting a rate of addition and/or an amount of addition of the biochar and/or metal salt commensurate with the changes in the amount of at least one contaminant present in the wastewater stream.

The foregoing and other objects, features, and advantages of the invention will become more apparent from the following detailed description, which proceeds with reference to the accompanying figures.

DETAILED DESCRIPTION

Figure 1:
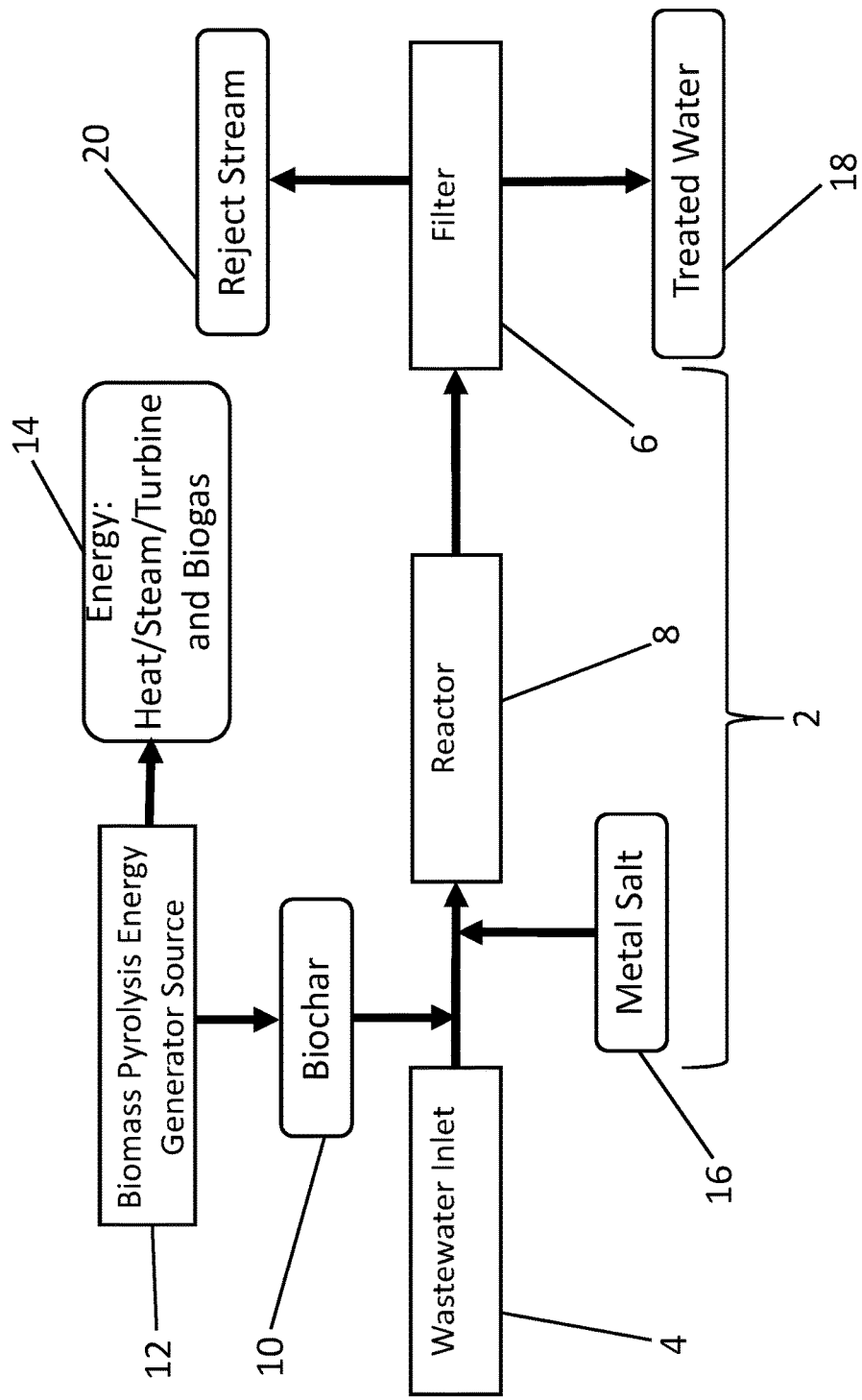
FIG. 1 is a flow chart illustrating an exemplary embodiment of the process disclosed herein.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

I. Overview

Disclosed herein are embodiments of a water treatment apparatus comprising biochar that can efficiently remove contaminants from a wastewater stream. U.S. Pat. Nos. 7,399,416 and 7,713,423, both incorporated herein by reference, describe a reactive filtration process and system where a metal salt reagent is added to a stream of water prior to a bed of moving sand. The sand becomes coated with adsorptive iron oxyhydroxides, which act to remove contaminants from water. The motion of the sand acts to remove the coating, which can be washed or back-washed from the sand bed, thus removing the contaminants from the fluid. U.S. Pat. Nos. 7,445,721 and 7,744,764, both incorporated herein by reference, augment this reactive filtration by adding ozone. This allows oxidative destruction and removal of chemical contaminants via direct ozone chemical reaction, indirect oxidative byproduct chemical reaction, and metal oxide catalytic reactions. U.S. Pat. No. 7,713,426, incorporated herein by reference, modifies this reactive filtration process to further expose the treated water to ultraviolet light. U.S. Pat. No. 8,071,055, incorporated herein by reference, places a reactive filtration process after membrane filtration to treat water contaminants that are not well removed by membrane filtration.

In all of these approaches, the removal of contaminants in a process reject stream, typically in a fluid stream that is a small fraction of the initial treatment fluid stream, allows physical separation of contaminants from the treated fluid stream. U.S. Pat. No. 8,080,163, incorporated herein by reference, discloses recycling the process reject stream upstream of the reactive filtration process effective to lower an average contaminant concentration of effluent water from the moving media filter. Overall reactive filtration has demonstrated highly efficient removal of nutrient phosphorus in wastewater streams in municipal and industrial wastewater applications. While cost efficient, and efficient in removing many contaminants from the fluid stream, reactive filtration using iron salt reagents alone, or in combination with an oxidizer, produces a rejection byproduct of concentrated iron oxides. This has some utility in recovering and reusing phosphorus, a key agriculture nutrient. However, repeated application of highly concentrated iron oxides to some soils may be harmful to some agronomic outcomes.

In addition, reactive filtration using metal salts has some demonstrated ability to remove trace organic chemicals by particulate removal, adsorptive interaction with the hydrous ferric oxides formed in the process, and by co-removal of dissolved and suspended organic material in the fluid stream. However, treated waters may include non-polar, organic chemical contaminants of high bioactivity and toxic concern. Examples of such materials include hormonal agents and pharmaceuticals and their metabolites. These types of compounds may not be sufficiently removed to the very low levels that mitigate risk to public health and environmental quality using reactive filtration with metal salts.

Charcoals, activated charcoals, coal and carbonaceous composite substrates are commonly used in treating water or wastewater, as well as gaseous or vapor contaminants to remove trace organic chemicals, hazardous metals, and other toxic chemicals. The ability of cationic iron or other metal salts, such as aluminum salts, to chemically bind to the surface of charcoals, activated charcoals, coal and carbonaceous composite substrates is well demonstrated. Both ferrous and ferric iron readily adsorb to the surface of charcoals, activated charcoals, coal and carbonaceous composite substrates to varying degrees. These metal-salt-amended and modified charcoals, activated charcoals, coal and carbonaceous composite substrates, are capable of additional and often advantageous reactive chemistries that improves removing some contaminants from fluids. U.S. Pat. No. 6,770,205, incorporated herein by reference, teaches treating pollutants using iron-impregnated, carbon-coated, silica sand. This approach requires high temperature processing to create a one-time use reactive substrate with significant manufacturing and processing complexity, and thus cost.

U.S. patent application No. PCT/US2013/026975 describes a synthetic method for making modified biomass using a precursor metal solution and drying, growing plant materials with metal solution irrigation, or using the solid biomass residuals from anaerobic digestion. The modified biomass material is subjected to high temperature pyrolysis to form a biochar-metal composite. The adsorption of heavy metals using iron impregnated activated carbon has been demonstrated, as has the removal of arsenic removal by an iron oxide impregnated activated carbon. Additionally, methods have been described for preparing iron activated carbon composites to remove arsenic from water.

In all of these cases, the iron-amended charcoals or carbon composites require significant manufacturing steps and processing with other chemicals, producing a generic reactive substrate that may not have optimum performance for the contaminant mix in a particular wastewater. In addition, the utility in fluid filtering is limited by the finite adsorptive capacity of the metal-salt-amended and modified charcoals, activated charcoals, coal and carbonaceous composite substrates.

Metal-modified, bi-functional substrates for pollutant treatment have a significant development history as well in alternate solid substrates: U.S. Pat. Nos. 8,541,331 and 8,512,659 teach a method of synthesizing and using iron-containing aluminosilicate zeolites; U.S. Pat. No. 7,884,043 teaches manufacturing and using a zeolite modified with iron and aluminum for removing heavy metals from water; U.S. Pat. No. 7,658,853 describes a process for treating contaminated water by means of a bifunctional system consisting of iron metal and zeolites; and U.S. Pat. No. 6,379,555 teaches a wastewater treatment process using activated carbon and magnesium hydroxide.

Although the use of charcoals, activated charcoals, coal and carbonaceous substrates is well demonstrated in numerous applications including water treatment, the use of biochar has recently been demonstrated to have the potential for biomass byproduct recycling, especially in agricultural, industrial and forest products' carbonaceous waste streams. Biochar typically results from the controlled pyrolysis of biomass, although it can also be manufactured using hydrothermal, high pressure and high temperature water processing of biomass. The primary biochar applications are: as an energy generation byproduct resource; for use in carbon sequestration; as a soil amendment; and as a carbonaceous substrate for water treatment. Biochars have been shown to be able to adsorb metal ions. Depending on the biomass source and production method of the biochar, polar functional groups on the native charred material, such as hydroxyl and carboxylic acid groups, present active adsorption sites. These active adsorption sites can adsorb metal cations, such as ferrous and ferric iron, in the general range of tens to one hundred milligrams of total iron per gram of carbonaceous substrate. The sorption of phosphate, ammonium, and nitrate on biochar has been demonstrated and it has also been shown that biochar can remove phosphates directly from water. An aluminum oxyhydroxide modified biochar nanocomposite removed phosphate and other contaminants from water. And magnetic iron oxide biochar preparations can adsorb contaminants and further allow magnetic separation. Iron metal filings and biochar has been demonstrated for contaminant removal. U.S. patent application No. PCT/US2013/026975 describe a synthetic method of pretreating biomass with a precursor metal solution, growing plant materials with metal solution irrigation, or using the solid biomass residuals from anaerobic digestion, then subjecting the biomass material to high temperature pyrolysis to form a biochar-metal composite. Additionally, a method of engineering biochar with magnesium to reclaim phosphate from water as a fertilizer has been described, and also a method for enhancing the nitrate sorption capacity of strong acid chemically activated biochars. And the catalytic potential of biochar with ozonation or hydrogen peroxide addition to treat recalcitrant fluid contaminants has been described.

Runoff from agricultural land that has been treated with fertilizer can result in nutrient impacted water, such as when phosphorus and/or nitrogen compounds are washed into streams, rivers, ponds and lakes. Both phosphorus and nitrogen from fertilizers can initiate undesirable aquatic ecosystem and water quality outcomes, sometimes resulting from accelerated algae growth and eutrophication. Biochar as a soil amendment has been shown to reduce phosphorus and nitrogen leaching while maintaining plant availability. Thus, adsorption of phosphorus and nitrogen compounds onto biochar can inhibit or substantially prevent these compounds being washed into the watercourses, when the mixture is used as a fertilizer. For example, ammonia adsorbs onto biochar, and the composition retains its stability in a soil matrix as a fertilizer, thus preventing runoff of nitrogenous compounds into the watershed. In the aqueous phase, this adsorption and bioavailability may result from formation of ammonium ions.

In an era of human-induced climate, The Emissions Gap Report 2013, published by the United Nations Environment Program, states that "regarding biomass, bioenergy production combined with carbon capture and storage (BioCCS) technology is a negative-emission solution that could offer a powerful means to reduce GHG emissions." Furthermore, the Report states that "the use of BioCCS depends on the technical and social feasibility of large-scale CCS and the technical and social feasibility of sustainable large-scale bioenergy production." Thus, there is a need to design and develop new biomass energy generation systems that co-produce clean water and enhance sustainable agriculture to advance technical and social feasibility of BioCSS.

While the promise of biochar and amended or engineered biochar for the treatment of contaminants, nutrient control and nutrient recycling is significant, its use has been primarily limited to direct field application, or to water treatment columns which are known for using charcoals, activated charcoals, coal and carbonaceous substrates. The major shortcomings that affect application of biochar for water treatment include: the engineered solutions for high flow fluids at industrial or municipal scale and distributed water treatment systems; structural integrity of the charred material; variability of the substrate properties arising from the variety of biomass sources; and in process control for reliable removal of contaminants and recyclable nutrients at high efficiency and low cost. Significant process improvements are needed to realize the promise of biochar, charcoals, activated charcoals, coal and carbonaceous substrates, modified or in their native state, to enhance water treatment and nutrient reuse for future sustainability. The disclosed embodiments address this need.

II. Description of the System

The disclosed embodiments describe a water treatment system and process. Certain disclosed embodiments integrate bioenergy production with carbon capture and storage technology. Such embodiments may comprise adding a particulate carbonaceous substrate, with less material hardness than sand, and optionally, a metal salt solution, to the flowing fluid. This allows mixing and reaction time before filtration in a moving bed reactive filter that further allows for cleaned water and the separation of potentially useful solids.

FIG. 1 provides a schematic diagram of one embodiment of the wastewater treatment apparatus. With reference to FIG. 1, wastewater enters a wastewater flow pathway 2 from a wastewater inlet 4. As used herein, "wastewater" refers to any water to be treated. "Wastewater" may be, but is not necessarily, highly contaminated water. "Wastewater" may contain only trace amounts of phosphorus, nitrogen-containing contaminants, metals or other contaminants such as organic or inorganic contaminants, in single or mixed solution. The contaminants may be dissolved and/or suspended. The "wastewater" may contain substances of known or unknown risk to human health and environmental quality, or substances to be recovered for use, reuse or recycling. Wastewater may come from any industrial, agricultural, municipal, or natural source, or any combination thereof. Examples of target contaminants include but are not limited to: hydrocarbons such as polycyclic aromatic hydrocarbons, PAHs, which arise from water contamination in petroleum or natural gas operations; mercury, including methyl mercury and other organomercurials, such as in municipal and coal energy wastewater; other heavy and/or toxic metals such as arsenic; pathogenic microbial cells, such as *Escherichia coli*, from human and animal wastewaters; phosphorus- and nitrogen-containing compounds and salts; and hormonally active chemicals and human and veterinary pharmaceuticals, and their metabolites, from human and animal wastewaters. The wastewater inlet 4 may be directly fluidly connected to one or more sources. Alternatively, wastewater inlet 4 may be connected to a reservoir or tank that is directly or indirectly supplied from the source(s). The wastewater flow pathway 2 connects the wastewater inlet 4 to a filter 6, and comprises a reactor region 8. Also along the wastewater flow pathway 2, biochar 10 is added to the wastewater.

Biochar 10 is typically produced by biomass pyrolysis or hydrothermal processing. Biomass pyrolysis energy generator source 12 may provide an onsite or offsite energy generation resource through any of several energy conversion technologies 14 including, but not limited to, heat generation, steam generation, and syngas (synthesis gas) production. The biomass pyrolysis energy generator source 12 produces a biochar byproduct 10 of the high temperature controlled oxygen pyrolysis conditions in that source. The biomass pyrolysis energy generator source 12 can use an array of biomass materials including, solely by way of example, agricultural crop waste, forestry waste, algae, animal or human waste, industrial waste, anaerobic digester waste, or municipal waste or any combination of these. Plant materials grown for the purpose of biomass production, for example switchgrass straw, *Panicum virgatum*, are also a source of the biochar byproduct. Biochar product 10 can be produced in any of a number of physical forms, such as granular, pulverized, or powdered solid biochar 10. Such biochar 10 can be used as directly produced by the biomass pyrolysis energy generator source 12 or after treatment or activation by chemical, physical or mechanical processes. The biochar 10 may be added to the wastewater in the wastewater flow pathway 2 as a dry material or as a fluid slurry or suspension, or both. Biochar 10 can be added at a concentration appropriate to the contamination level of the wastewater, and the desirable and/or optimum operation of the reactor 8 and filter 6. Biochar 10 can be added to the flowing wastewater by any suitable means such as, but not limited to, a hopper and auger, mixing basin, direct injection aided by air pressure, venturi effect, fluid pressure, or any combination thereof. Biochar 10 can be mixed into the flowing wastewater with a variety of devices, including, but not limited to, static mixer using a tortuous path, active mechanical mixing, energetic mixing, or any combination thereof.

In alternative embodiments, charcoals, activated charcoals, coal and other carbonaceous substrates, may be used in place of, or in addition to, biochar 10. The charcoals, activated charcoals, coal and other carbonaceous substrates may be modified with metal salts, or other chemical or physical processing, or used in their native state. The exemplary embodiment illustrated in FIG. 1 shows that biomass pyrolysis is the source of biochar 10 used in the wastewater treatment; however, in other embodiments, biochar 10 or other carbonaceous substrate may be commercially purchased.

Adsorption of many chemicals on biochar 10 and other carbonaceous substrates is typically in the range of milligrams to hundreds of milligrams per gram of the carbonaceous substrate. Many wastewaters contain levels of contaminants not exceeding tens or hundreds of milligrams per gallon. Therefore, in some embodiments, biochar 10 and/or other carbonaceous substrates are added to the wastewater treatment in an amount of from greater than zero to greater than two grams of material per gallon of wastewater treated in the process, such as from one milligram to two grams, or from five milligrams to one gram.

A. Wastewater Pathway

With reference to FIG. 1, the reactor 8 can be any reactor suitable for mixing wastewater with any materials added to it. In some embodiments, the mixing is achieved by physical and/or energetic stifling or other agitation, generating or increasing turbulence within the flow or a combination thereof. In certain embodiments, the reactor is a plug flow reactor, and may be a serpentine plug flow pipe reactor. A person of ordinary skill in the art will appreciate that optimum mixing and reaction times for the reactor 8 will be determined by particular wastewater chemical characteristics, including, but not limited to, pH and hardness. For example, the length and diameter of a plug flow reactor will be selected to provide the optimum mixing and reaction times based on the characteristics of the particular wastewater stream that will flow there through.

In some embodiments, such as the exemplary embodiment shown in FIG. 1, a metal salt 16 is added to the wastewater flowing in the wastewater flow pathway 2. The metal salt may be added as a solution, such as an aqueous concentrate, as a dry solid reagent, such as a powder or granules, as a slurry or suspension, or combinations thereof. The metal salt can be any metal salt suitable for treating or purifying the water such as by reacting with contaminants in the water, activating the biochar, facilitating precipitation of contaminants in the water and/or any other mechanisms for removing contaminants. In some embodiments, the metal salt comprises iron, aluminum, calcium, magnesium, manganese, zinc, copper or a combination thereof, and in particular embodiments, the metal salt comprises iron. Common iron metal salts include ferrous, ferric cations, and ferrate anions. Other suitable cations include, but are not limited to, sodium, potassium, calcium and magnesium. Suitable anions include, but are not limited to, common soluble anions such as chloride, bromide, iodide or sulfate. In some embodiments, the metal salt comprises ferric chloride, ferrous chloride, ferric sulfate, ferrous sulfate, aluminum chloride, aluminum sulfate, potassium aluminum sulfate, aluminum hydroxide or a combination thereof. In certain embodiments, the metal salt is a ferric halide, such as ferric chloride.

Iron metal salts can form a reactive filtration substrate on surfaces that adsorb iron oxyhydroxides and iron cations from mixed solution. U.S. Pat. Nos. 7,399,416 and 7,713,423, incorporated herein by reference, disclosed exploiting this property in the reaction of the iron oxyhydroxides spontaneously forming and adsorbing to create a reactive surface coating on the sand substrate in a moving bed sand filter, thus creating a reactive filter. In contrast, in the exemplary embodiment of the system and process described in FIG. 1, a solid carbonaceous substrate with desirable native properties to adsorb contaminants from wastewater, for example biochar 10, is added and mixed with the flowing fluid stream. The solid carbonaceous substrate then reacts in that flowing fluid stream with a solution of the metal salt 16, for example an iron salt solution. The carbonaceous substrate adsorbs and chemically binds a portion or the totality of the added metal salt. This forms a modified solid carbonaceous substrate in the flowing fluid from a rapidly forming and renewable oxide coating, such as a hydrous ferric oxide coating. The carbonaceous substrate, thus surface-modified with regions of increased charged ionic or polar reactive sites from the metal, is now augmented to remove a greater range of contaminants from wastewater. Active carbon-carbon adsorptive sites normally associated with the desirable use of carbonaceous substrates, for example activated charcoals, are preserved for water treatment. The now modified bifunctional reactive biochar and any residual metal, such as residual iron, remaining in solution are amenable to an optimized reaction time for favorable partitioning of dissolved and suspended wastewater contaminants onto the reactive surfaces. Once partitioned onto these surfaces, they may be removed by physical and/or chemical separation processes to remove them from the fluid stream. In some embodiments, balancing of the biochar 10 and iron salt 16 additions with regards to subsequent reaction and mixing in the reactor 6 can enable preconditioning of the reactive matrix of iron modified biochar 10 and residual iron oxyhydroxides in the flowing wastewater. This preconditioning may allow the reactive matrix to retain its reactive ability throughout the treatment process and over the full length of the water pathway and into the subsequent filter 6. The wastewater therefore is dynamically treated for contaminant removal throughout the wastewater flow pathway 2. The solid reactive matrix of iron modified biochar 10 and residual iron oxyhydroxides in the flowing fluid can modify the sand surface and the sand bed itself in the filter, both chemically and physically, to create a reactive filter.

Typical concentrations of the metal, such as iron, added as the metal salt 16 are in the range of from greater than 0 to greater than 100 milligrams of metal per liter of wastewater, such as from 1 to 50 milligrams or from 1 to 25 milligrams. However, in some embodiments, it may be operationally advantageous to add less or more of this reagent depending on specific wastewater characteristics and desired contaminant removal. In certain embodiments, addition of an iron metal salt solution to the wastewater with added non-soluble solid biochar 10 allows for the adsorption of iron onto the carbonaceous substrate particulates.

The International Union of Pure and Applied Chemistry, IUPAC, standardizes pore sizes as micropores, which are less than 2 nanometers, mesopores, which are between 2 and 50 nanometers, and macropores, which are greater than 50 nanometers. Native and iron modified charcoals, activated charcoals, coal, carbonaceous substrates and biochars have numerous pores of varying sizes. This provides good porosities and surface area that depend on the specific material and method of preparation. High porosity allows for very high reactive surface area and thus very high surface reaction potential in native or modified forms. The lower relative density and hardness of carbonaceous substrates, such as biochar, compared to sand make them well suited for physical separation from fluids, such as by a moving bed reactive sand filter.

In some embodiments, such as the exemplary embodiment illustrated in FIG. 1, the biochar 10 is added into the wastewater pathway 2, followed by the metal salt 16. In other embodiments, the metal salt 16 is added before the biochar 10. Both the biochar 10 and the metal salt 16 may be added to the wastewater pathway 2 before the reactor 8; or the biochar 10 may be added before the reactor 8, and the metal salt after; or the metal salt 16 may be added before and the biochar 10 after. In a preferred embodiment, the biochar 10 and metal salt 16 are both added before the reactor 8. This order of addition can be advantageous. It allows determining the level of contamination and water quality characteristics of the wastewater in the pathway 2, and reagent demand for biochar 10 and metal salt 16 can be adjusted, in a manual or automatic process. The demand can be the result of water quality sensors with real-time electronic control system feedback and input reagent control anywhere along the fluid process pathway of FIG. 1, such as at the wastewater inlet, before and/or after the reactor, at the filter, at the treated water outlet or any combination thereof. Manual sampling and then analysis external to the system of FIG. 1 followed by manual adjustment of biochar 10 and metal salt 16 inputs also can be used. The operational value of this feedback characteristic of the process in FIG. 1 is that the reactive filtration reagents, biochar 10, and iron metal salt 16, are able to be optimized on demand for changing wastewater characteristics to provide for operational control of the process efficiency of the inputs and product of the process in FIG. 1. A co-result is reduced waste of valuable process inputs biochar 10 and metal salt 16, while affording optimization of process results and lower costs of operation.

The exemplary embodiment illustrated in FIG. 1 shows the serial addition of biochar 10 and metal salt 16 prior to mixing and reaction in the reactor 8. An alternate embodiment premixes the biochar 10 with a concentrated metal salt solution to form a slurry. This slurry is added to the wastewater pathway prior to the reactor 8. This embodiment is advantageous in some circumstances, since the very acidic pH of concentrated metal salt solutions can activate carbonaceous substrates by increasing porosity and chemical functional groups. For example, the pH equals about 2 for 40% weight-volume iron chloride saturated solutions, and these acidic solutions have the ability to activate the surface of charcoals.

Premixing biochar 10 with a concentrated metal salt solution is advantageous in some embodiments because it eliminates the manufacturing step of producing an activated carbonaceous substrate. Activating the biochar 10 in situ is advantageous to overall engineering efficiency and lower operating costs, while increasing the reactive adsorptive efficiency of the carbonaceous substrate.

In an alternate embodiment, a metal salt is not added to the wastewater pathway 2. In certain embodiments, only biochar 4 or another carbonaceous substrate is added to the wastewater pathway 2 prior to the reactor 8.

In other embodiments, an oxidant 11 is added to the wastewater pathway. The oxidant 11 can be any oxidant suitable for removing a contaminant from the water, killing and/or inhibiting the growth of a pathogen in the water, sterilizing the water, or any combination thereof. The oxidant may destructively remove a contaminant such as an organic compound, hormone, antibiotic or pathogen. In some embodiments, the oxidant 11 is selected from ozone, oxygen, peroxides, persulfates, permanganates, perchlorates, chlorates, chlorites, hypochlorites, fluorine, chlorine, bromine, iodine, or any combination thereof. In certain embodiments, the oxidant 11 is ozone, potassium permanganate, sodium hypochlorite, or hydrogen peroxide. The oxidant 11 may be added before or after the addition of biochar 10, charcoals, activated charcoals, coal and other carbonaceous substrates, and before or after the addition of the metal salt 16, such as an iron metal salt solution, if present. The oxidant 11 may be added upstream of the reactor 8 or downstream of the reactor 8. Alternatively, the oxidant 11 can be added to the wastewater pathway in the reactor 8. U.S. Pat. Nos. 7,445,721 and 7,744,764, incorporated herein by reference, teach the addition of ozone and iron metal salts to form a renewable catalytic oxidation substrate for homogeneous catalysis and heterogeneous catalysis in the pre-reaction zone and in the massive reactive bed of the iron oxide coated sand (IOCS) in the moving bed filter. Activated carbon can transform ozone into highly reactive hydroxyl radicals capable of destroying many contaminants of concern. Carbonaceous substrates such as activated carbon and biochar adsorb non-polar chemicals, such as PAHs. This surface binding may be an advantageous for the catalytic oxidation of many organic chemicals. Thus, it is advantageous to add carbonaceous substrates, especially an inexpensive byproduct such as biochar, to water for the purposes of catalytic oxidation to destroy potentially toxic chemicals of concern. The combination of biochar and oxidant, such as ozone, can also remove pathogens from the wastewater. In some embodiments, a biochar/oxidant combination can contribute to a substantially sterilized water stream, such as by destructively removing pathogens from the water.

In alternate embodiments, the ozone is added before or after the addition of biochar, charcoals, activated charcoals, coal and other carbonaceous substrate, without the addition of the metal salt 16.

In other examples, an organic carbon compound, for example an alcohol, a saccharide, a cellulose derivative, or a combination thereof, is added to the wastewater pathway 2, before or after the addition of biochar, charcoals, activated charcoals, coal and other carbonaceous substrate, with or without addition of the metal salt 16. The saccharine may be a monosaccharide, disaccharide, trisaccharide, tetrasaccharide, polysaccharide, or a combination thereof. In some examples, the organic carbon compound is methanol, ethanol, ethylene glycol, glycerol, acetate, glycerin, glucose, galactose, maltose, fructose, hydroxyethyl cellulose, hydroxypropyl cellulose, carboxymethyl cellulose or a combination thereof. The organic carbon compound can act as a feedstock to promote microbial denitrification or dissimilatory nitrate reduction within the reactor bed to aid in removal of nitrogen compounds from the wastewater. Denitrification is the microbially driven reduction of oxidized forms of nitrogen, such as nitrate, into reduced forms and finally to nitrogen gas, as a result of respiratory processes. Dissimilatory nitrate reduction to ammonium is accomplished by certain microorganisms with the genetic make-up for this metabolic action.

B. Filtration System

Referring again to FIG. 1, after mixing and reacting in the reactor 8, the wastewater in the wastewater flow pathway 2, modified with biochar 10 and optionally with a metal salt 16, such as an iron salt solution, ozone and/or an organic carbon compound, continues into the inlet of a filter 6. The filter 6 can be any filter suitable to separate a treated water stream 18 from a reject stream 20. In some embodiments, the filter 6 is a moving bed filter, a continuously moving bed filter, moving bed reactive filter, a continuously moving bed reactive filter, a cycled backwash filter, fluidized bed filter, agitated bed filter, horizontal flow bed of the filter substrate, membrane filter, disk filter, cloth filter or other filter mechanically, physically, or energetically moved. A preferred embodiment uses a sand bed; however, alternate particulate filtration media, natural or synthetic, may be used instead. Examples of alternate solid filtration media in the reactive filter bed include, but are not limited to, anthracite coal, garnet sand, natural or synthetic minerals, polymeric or plastic beads, or synthetic substrates including carbonaceous substrates.

Figure 2:
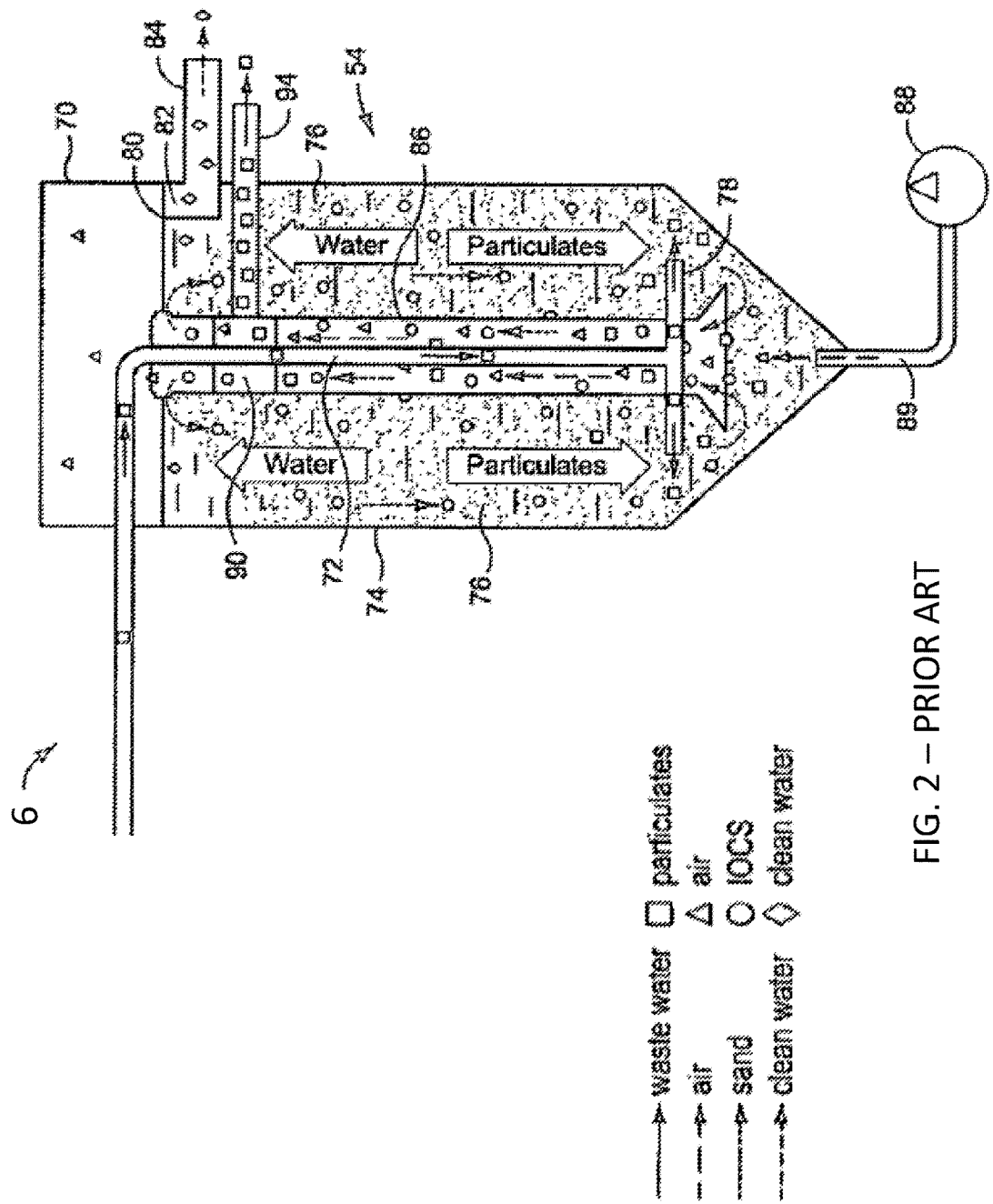
FIG. 2 is a cross-sectional representation of a moving bed reactive sand filter.

In some embodiments, the filter 6 is a continuously moving bed reactive sand filter. Exemplary reactive filtration configurations are described in U.S. Pat. Nos. 7,399,416 and 7,713,423, both incorporated herein by reference, and one exemplary embodiment is illustrated in FIG. 2. Briefly, the wastewater enters the continuously moving bed reactive sand filter 6 in an upwards flow, initially from the bottom of the sand bed 76, by means of a central distribution assembly of concentric pipes. One pipe 72 provides inlet down flow of wastewater to the bottom of the sand bed. An additional pipe 86 includes a directional cone for capturing rising air bubbles inserted into the very bottom of the sand bed from an external air compressor 88. The sand 76, water, and filter contaminant slurry rise into the central column assembly in the filter 6. This wastewater distribution assembly discharges the inlet wastewater through the lower fluid assembly 78 into the near bottom of the sand bed for upwards flow through the sand bed 76. This system allows for downward flow movement of the sand bed resulting from air bubble in-flow from an inlet 89 at the base of the sand column connected to an air compressor 88 in the bottom of the central assembly pipe, below the inlet 78 wastewater distribution into the bed. Air under pressure from the inlet 89 enters the saturated sand bed. The rising action of the bubbles force a slurry of sand, filter particles, and air to rise in the central assembly and to the washbox 90, which may be a tortuous flow washbox. The washbox 90 provides for gravity and hydraulic flow driven density separation of the denser sand from the less dense filtered particulates, which continue in the hydraulic flow to be discharged as a filter reject through outlet 94. The denser sand falls from the washbox 90 into the main part of the sand bed, and is rinsed with a small portion, for example 5%, of the filtered water up flowing from the sand bed and channeled to join the particulate reject flow for discharge. The up flowing filtrate, exiting from the top of the sand bed, pools above the sand bed and drains into stilling well 80 and is discharged from the reactor as cleaned water. As described in U.S. Pat. Nos. 7,399,416 and 7,713,423, iron salts added to the wastewater flow may result in the formation of reactive hydrous ferric oxides that suspend in solution and adhere to the sand in the sand filter bed creating a reactive iron coated sand before being removed by the abrasive action of moving sand further down in the moving sand filter bed.

Referring again to FIG. 1, a novel and highly advantageous feature of the system and method disclosed herein is the addition of a solid carbonaceous reactive substrate to the wastewater in the wastewater pathway 2, and have the flowing, mixed, and reacted substrate subsequently injected directly into the lower portions of the sand bed filter 6. The abrasive action of the inter-grain motion of the moving sand, and the very high forces in the lower bed resulting from the mass of sand in the upper region of the bed in a moving bed reactive sand filter 6, has a desirable "flour milling" effect on the suspended granular, pulverized, or powdered biochar 10 in the wastewater entering the filter bed. This result happens since the material hardness of typical quartz sand in the filter is typically several times greater than biochar and most charcoals, activated charcoals, coal and carbonaceous substrates. For example, the Mohs hardness of quartz sand is about 7 and the Mohs hardness of activated charcoal is typically less than 3. Thus, this hardness differential allows for crushing and grinding of the carbonaceous substrate in the lower moving sand bed. This decreases particle size and increases reactive surface area to further remove contaminants from the wastewater in the process. The added material can then also act as a dynamic filter aid by decreasing the net pore size of the sand filter bed as the biochar 10 moves downward, thus retaining smaller contaminant particles and increasing overall filtration efficiency. This novel, dynamic pulverization of the solid carbonaceous substrate from the wastewater with added biochar 10 within the downwardly moving reactive bed provides a greatly increasing reactive surface area per mass, and a zone of downwardly moving, decreasing permeability in the lower portion of the moving sand bed.

This is a significantly advantageous development that increases the removal of suspended contaminant particulates and dissolved contaminant chemicals. Indeed, one of the challenges in sand filtration of contaminated waters is the formation of gelatinous layers on or around the sand media, often called biofilms, Schmutzdecke, or hypogeal layers. While slow or static sand filter beds for water treatment may benefit from these biofilms for increasing treatment efficiency by biologically removing or degrading some water contaminants, Schmutzdecke can also function to build up and fill the inter-grain pores of the sand bed. This occurs by the action of the microbes and filtered particles, forming a "glue" and cementing sand particles together in critical regions in the filter. This decreases permeability and permeate flow to unacceptable levels, and thereby reduces filter efficiency and operational consistency. Many bacteria form and excrete glue-like "adhesins," exudate macromolecules that are commonly proteins or polysaccharides, to help them adhere to surfaces; these chemical "glues" help bacteria withstand high shear forces. One of the fundamental properties in adsorption science is "like-likes-like". That is to say, charged chemicals "like" charged surfaces, and uncharged or non-polar chemicals "like" the uncharged or non-polar surface regions of carbon substrates, for example biochar or charcoals. The addition of carbonaceous substrates into the sand bed helps provide an alternate and, for many biochemical adhesins, a more active "like-likes-like" bacterial carbon compound for receiving adhesins. Accordingly, the overall sand filter operation is not as likely to fail from cementation or buildup of Schmutzdecke. One highly desirable result of adding native or iron modified biochar or other carbonaceous substrates, is that as the added carbonaceous substrate particles are readily removed from a moving bed sand reactor in normal filter operation, biofilm and Schmutzdecke buildup are minimized. At the same time, desirable biofilm production, such as in the case of cultivating and feeding denitrifying bacteria for nitrogen removal from the wastewater, is possible within the numerous pores of the biochar material within the sand bed. These spaces provide a physical region and refuge for desirable denitrifying bacteria, sheltering them from predator microorganisms such as protozoa. These novel actions of biochar within the moving sand bed are significantly advantageous developments in increasing filter efficiency and operational efficiency of removal of suspended contaminant particulates and dissolved contaminant chemicals.

Referring to FIG. 2, an up flow moving bed reactive sand filter 6 discharges the up flowing reacted and filtered, and now treated, water 82, countercurrent through the downward moving sand bed that acts to carry removed particulate to the lower portion of the bed. This now treated water 82 is removed by hydraulic flow into a stilling well after pooling above the downwardly moving sand bed. In typical operation, cleaned sand falling from a tortuous flow washbox 90 by gravity action separates the sand from the reject water stream containing the filtered contaminants. Typical washbox configurations allow for a small portion of the up flowing clean treated water to be directed by hydraulic flow past the falling sand, enabling sand to be washed prior to falling onto the downwardly moving sand bed through the pooled treated water above the sand bed. The reject stream with solids, acting from the physical force of the rising air bubbles and resulting hydraulic flow in the central column assembly, continues in a separate pathway isolated from the contaminant-laden filtrate rising in the central assembly of the up-flow moving bed reactive sand filter 6. Treated water 82 is discharged from the moving bed reactive sand filter 6 and may be suitable for reuse, recycling, or discharge into the environment.

Filter aids can be used to enhance micro particulate separation from liquids. Filter aids are usually highly porous media added to liquids to increase separation efficiency. Filter aids are added to a liquid prior to mechanical or physical filtration processes. Their high porosity and ability to be added in a dynamic manner make filter aids desirable for separations. Filter aids help maintain porosity in some filtration operations; however, their use is mainly limited to clarifiers and vacuum filtration across a permeable flat filter.

Filter aids are disadvantageous in static column filters since they will load up the initial filter bed region and decrease filtrate permeability. Diatomite, perlite and cellulose are common materials used as filter aids. Although diatomite is the most widely used filter aid, many organic materials, such as potato starch particles, cotton fibers and solid polymers, are also used. The char and ash from combustion of some biomass materials such as rice hull can be used as a filter aid.

With reference to FIG. 2, the sand in the region above and below the lower-bed water distribution 78 will contain higher amounts of the solid carbonaceous substrate added to the flowing wastewater. This region can be further illustrated as a discrete horizontal sedimentary zone within the sand bed where the black carbonaceous substrate creates a reactive zone within the lower part of the moving sand bed. This discrete zone is dynamic because new carbonaceous substrate is entering the sand bed from the in-flowing wastewater. This in-flux is dynamically balanced by the out-flux in the normal moving bed sand reactor 54 by particulate removal in the lower bed by the rising air, sand, particulate and water slurry. This discrete zone now becomes highly reactive for contaminant adsorption because the dilute suspension of the carbonaceous substrate prior to entering the moving sand bed reactor has been concentrated and fixed into the pores of the moving sand bed. And permeate flow is forced across the reactive surfaces of the carbonaceous substrate.

By the action of the upward flowing water and the slow downward moving sand shown in FIG. 2, at, for example, a few inches per hour, the carbonaceous substrate particles create a dynamic reactive zone within the lower moving sand bed. It is advantageous to have such a dynamic reactive zone to enhance the removal of soluble and suspended water contaminants at high efficiency, as a result of decreased porosity in the sand bed by the carbonaceous substrate and the coupled reactive surface. While filter bed plugging is always an operational challenge in water treatment, the lower density and lower hardness, as well as the solid, insoluble structural integrity of carbonaceous substrates such as biochars and chars, affords a desirable non-caking or non-cementing action in most common wastewaters. A highly reactive filtration gradient is thus established in the zone of the moving bed. A steady state is achieved in the reactive zone by the downward motion of the sand removing carbonaceous substrate particles, and input of new carbonaceous substrate at inlet 78. This steady state stabilizes the reaction zone. Thus, the moving bed sand filter 6 has the novel feature that the reactive filter media is continuously added to the flowing fluid, subsequently pulverized within the moving sand to increase reactive surface area, and then discharged with the normal particulate removal action of the moving bed sand filter.

C. Reject Stream And Solids Separation

Figure 3:
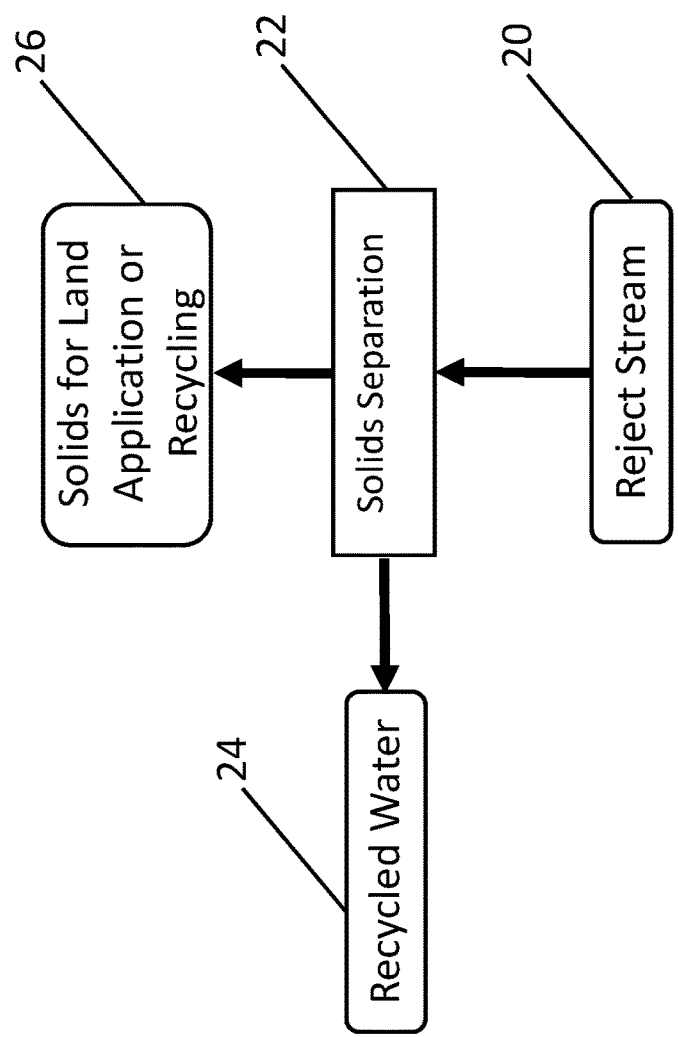
FIG. 3 is a flow chart illustrating separation of the reject stream into recycled water and solids.
Figure 4:
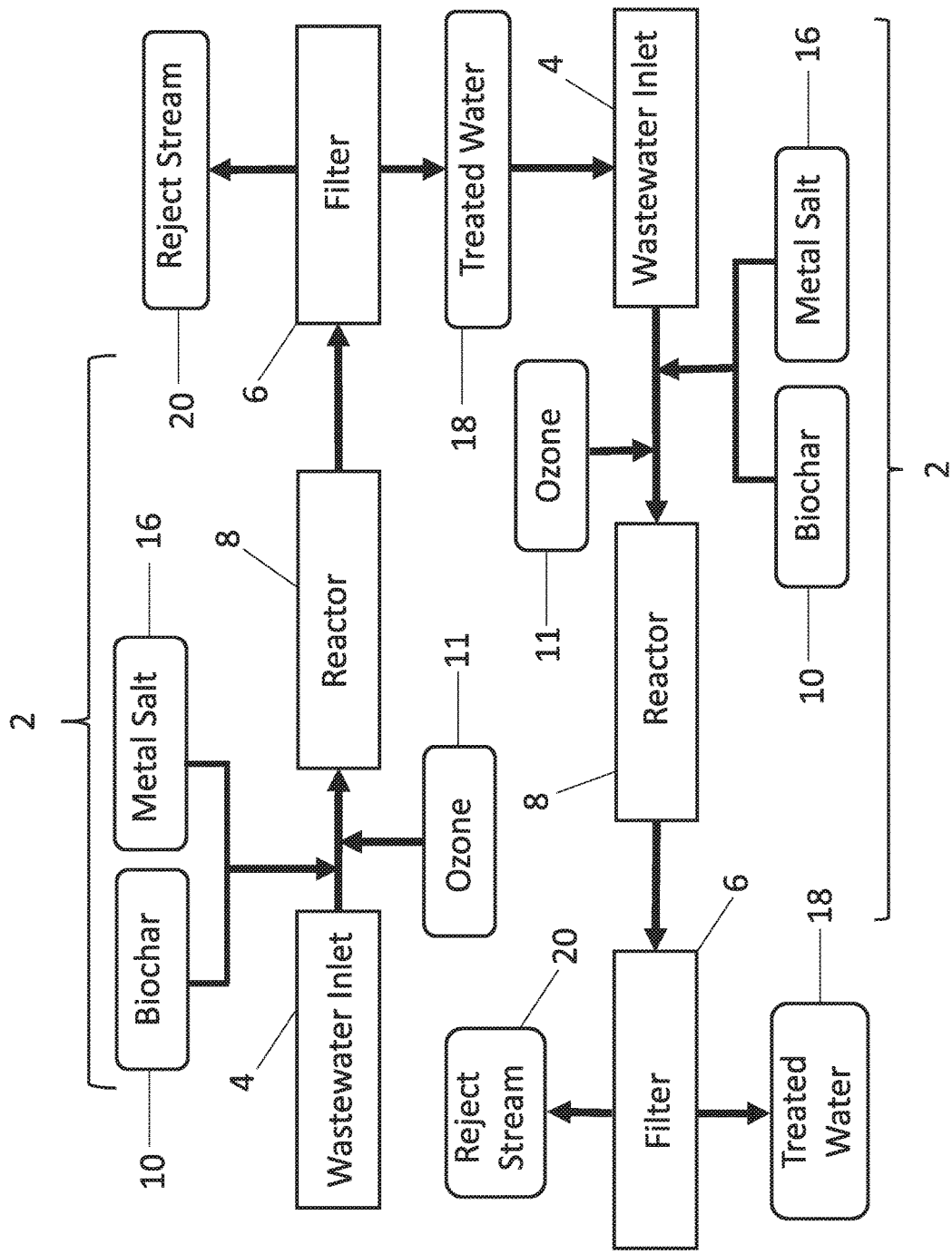
FIG. 4 is a flow chart illustrating an exemplary embodiment comprising a second fluid flow pathway coupled to a treated water outlet of a first fluid flow pathway.

Referring to FIG. 3, the reject stream 20, which may include solids, is discharged from the filter 6. The reject stream 20 contains separated suspended water contaminants, filtered iron modified biochar particulates, iron oxyhydroxides, and is introduced to a solids separator 22. The solids separator 22 separates the reject water stream 20 into a recycled water stream 24 and a solid by-product stream 26. The solid by-product stream 26 may be a solid product or it may be a slurry or suspension of a solid in water. Stream 26 may be suitable for disposal, land application, or recycling. The recycled water stream 24 may be suitable for water recycling or further water treatment. The solid separator 22 can comprise a variety of mechanical, physical, chemical or energetic separators, and may include settling basins, mesh filtration, membrane filtration, cloth filtration, sand filtration, rotating mat filtration, chemical coagulation, polymer addition, centrifugal force separation, sieving, magnetic separation, plate or basin clarifiers, coalescence separation, other process appropriate to the task, and any combination thereof.

Solids for disposal, land application, or recycling 26, may contain valuable resources that can be reclaimed, reused, or recycled, directly or indirectly through further processing. An example of this is the removal of nutrient phosphorus as phosphates from municipal, industrial or agricultural waste streams. These phosphates may be recycled and/or reused as a fertilizer in agronomic applications. In some examples, the phosphates are recycled and/or reused on agricultural, silvicultural, residential, commercial, or municipal land or in horticultural soil containers. Adsorbed to iron modified biochar, the phosphorus in this fertilizer has desirable slow release activity while the biochar substrate maintains advantageous soil conditioning properties, and supports bioenergy production combined with carbon capture and storage (Bio-CCS) technology. This BIOCSS may mitigate climate change from atmospheric carbon dioxide and other greenhouse gases. Furthermore, the solids 26 containing biochar may help retain soil nutrients, such as phosphorus and nitrogen, in agricultural areas where the nutrients may otherwise be mobilized in surface runoff waters and subsurface infiltration waters, with the undesirable effect of increasing nutrients in surface waters and ground water. Nutrient pollution in surface water can lead to eutrophication and the creation of large scale water quality impacts including dead zones. In ground water, nitrogen pollution can create a risk to human health from nitrate toxicity.

An additional feature of the system described above and as exemplified in FIGS. 1 and 3 is that it enables the co-manufacturing of a biochar-based agricultural fertilizer product that is safer in use and transport, more easily applied, and better suited to the channels of trade and distribution in commercialization than unprocessed biochar alone. It is advantageous that the system processes the biochar 10 by the action of the water, the optionally added metal salts, such as iron metal cations, and dissolved or suspended chemical, mineral, or microbial detritus. These factors change the chemical and physical properties of the biochar-enhanced filtrate solids, such that their further use as a practical and efficacious agricultural fertilizer is enhanced. A common problem with biochar is that it can be friable. Friable biochar produces a fine dust that can decrease air quality, and thus threaten human health and environmental quality. This undesirable property makes field application of biochars as a soil amendment difficult, potentially hazardous, and dirty. In addition, since the very dry biochar product produced from a biochar source, such as a biomass pyrolysis energy generator source 12, is only partially combusted, it remains flammable, and thus is a hazardous material to transport. The common practice to reduce the hazard is to wet the biochar in transit. The solids for disposal, land application, or recycling 26, which contain a biochar residual, are already wetted, for example at 50% w/w. In addition, many wastewater types, including but not limited to, municipal wastewater, wastewaters from animal agriculture, and water following anaerobic digestion of waste material in syngas production, can contain significant total, suspended, and/or dissolved organic chemicals, many of which can be natural biopolymers such as humic and fulvic acids. These can act as binders for the smallest air buoyant biochar particles. The polymeric chemicals in the wastewater, or any natural or synthetic chemicals desirable for solids recovery and use, such as, but not limited to starch, common water treatment polymers, alum, alginic acid and carrageenan, can be added during the solids separation process 22. This addition affects not only efficient solids recovery, but provides for a densification and binding of the solids for disposal, land application, or recycling 26. This densification and binding can allow for "pelletizing" of the recovered solids at any desirable size. Pelletized biochar solids would have greater commercial distribution efficiency and agricultural fertilizer application efficiency, in addition to a reduction of the hazards associated with transport and use of native biochar and many other carbonaceous substrates. In some embodiments, the recovered solids are formulated into a form suitable for application to agricultural, silvicultural, residential, commercial, or municipal land or horticultural soil containers.

D. Conclusion

The advantages of the present invention include, without limitation, a continuously renewable reactive filtration process that removes water contaminants which adsorb to carbonaceous substrates. These contaminants include organic chemicals, and contaminants such as inorganic chemicals, for example, phosphates and metals, which efficiently adsorb to carbonaceous substrates modified by metal salts, such as iron salts. Addition of the added carbonaceous substrate, such as biochar, and metal salt, for example, in a solution, can be precisely controlled with process optimization feedback of changing input wastewater quality demand, and desired quality of the final water or solids discharged from the process. The water contaminants are efficiently removed by adding a carbonaceous substrate and optional metal salt solution, and allowing variable mixing and reaction times by use of a reactor, such as a plug flow reactor, before separation of the solids thus added in the process. Adding biochar and metal salts, such as iron salts, to the wastewater allows a surface reaction that adsorbs water contaminants onto the metal-modified carbonaceous solid. These biochar-metal-contaminant solids are better suited for further physical processing in the moving sand bed with the effect of abrasion and crushing of the biochar particles to smaller particulate sizes, producing larger effective surface areas activated for additional sorption and reactive filtration of remaining dissolved or suspended contaminants. The carbonaceous substrate particles, native or modified, that are added to the wastewater flow subsequently create a dynamic reactive zone within the lower sand bed in a continuously renewable reactive filtration process. The filtration process removes water contaminants using a lower density iron modified biochar particulate that is readily filterable from the filter.

The process uses a biochar media that has utility in energy generation and carbon sequestration. The process can be integrated with an energy generation subsystem that produces biochar or other carbonaceous substrate while producing energy. By removing water contaminants and pathogens, the process provides clean water and potentially useful byproducts that recycle phosphorus. These processes are integrated with bioenergy production and combined with carbon capture and storage technology to mitigate the production of greenhouse gasses and climate change. The waste from the process can be used in the production of a biochar-iron-phosphate fertilizer, which can increase soil quality and agronomic productivity while decreasing nutrient mobility potential and threats to human health and environmental quality. By using a water treatment process that increases potential for stabilizing and pelletizing the solid biochar process residuals in a commercial fertilizer or soils amendment product, the process decreases the toxic inhalation risk of friable biochar dusts and the hazardous combustible properties of dry native biochar.

In some embodiments, two or more disclosed systems may be combined, such as in series, parallel, or a combination thereof.

In particular embodiments, the water treatment system comprises a wastewater inlet, a biochar inlet, a metal salt inlet, a plug flow reactor, a moving bed reactive sand filter, and a solids separator. Other particular embodiments comprise an energy generator comprising a biomass pyrolyzer that produces biochar, a wastewater inlet, a biochar inlet, a metal salt inlet, a plug flow reactor, a moving bed reactive sand filter comprising a treated water outlet and a reject stream outlet, and a solids separator fluidly coupled to the reject stream outlet, the solids separator comprising a recycled water outlet and a solids outlet. The metal salt may be iron chloride, and the embodiments may further comprise an ozone inlet, which may be upstream of the plug flow reactor.

In some examples, the method comprises adding biochar to a wastewater stream, the wastewater stream comprising at least one contaminant; adding an iron salt to the wastewater stream; adding ozone to the wastewater stream; mixing the biochar, iron salt and ozone with the wastewater stream in a plug flow reactor; filtering the wastewater stream in a moving bed reactive sand filter to produce a treated water stream and a reject stream comprising solids; removing the solids from the reject stream to produce a recycled water stream and a solid product; and pelletizing the solid product.

In other examples, the method comprises adding biochar to a wastewater stream, the wastewater stream comprising at least one contaminant; adding an iron salt to the wastewater stream; adding ozone to the wastewater stream; mixing the biochar, iron salt and ozone with the wastewater stream in a plug flow reactor; filtering the wastewater stream in a moving bed reactive sand filter to produce a treated water stream and a reject stream comprising solids; removing the solids from the reject stream to produce a recycled water stream and a solid product; formulating the solid product into a form suitable for application to agricultural, silvicultural, residential, commercial, or municipal land or horticultural soil containers; and applying the solid product to agricultural, silvicultural, residential, commercial, or municipal land or horticultural soil containers.

In particular embodiments, the method comprises pyrolyzing a biomass to produce biochar and heat, steam and/or syngas; generating electrical energy from the heat, steam and/or syngas, and at least partially powering a wastewater treatment system from the electrical energy, wherein the wastewater treatment system comprises a fluid flow pathway comprising a wastewater inlet for introducing a wastewater stream to the pathway, a biochar inlet, a metal salt inlet, an ozone inlet and a reactor; a filter downstream of the reactor and biochar inlet, the filter fluidly coupled to the fluid flow pathway; a treated water outlet fluidly coupled to the filter; a reject stream outlet fluidly coupled to the filter; and a solids separator fluidly coupled to the reject stream outlet. The method further comprises introducing a wastewater stream comprising at least one contaminant to the wastewater treatment system; adding the biochar to the wastewater stream; adding an iron salt to the wastewater stream; adding ozone to the wastewater stream; mixing the biochar, iron salt and ozone with the wastewater stream in a plug flow reactor; filtering the wastewater stream in a moving bed reactive sand filter to produce a treated water stream and a reject stream comprising solids; removing the solids from the reject stream to produce a recycled water stream and a solid product; formulating the solid product into a form suitable for application to agricultural land; and applying the solid product to agricultural, silvicultural, residential, commercial, or municipal land or horticultural soil containers.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for producing treated water suitable for reuse, comprising:
    a first fluid flow pathway, comprising a wastewater inlet for introducing a wastewater stream to the first pathway, a biochar/metal salt inlet for introducing a pre-mixed mixture comprising biochar and a first metal salt to the first pathway, and a first reactor downstream of the first inlet;
    a first moving bed reactive sand filter downstream of the first reactor, the first filter fluidly coupled to the first fluid flow pathway to receive fluid flow from the first fluid flow pathway;
    a first treated water outlet fluidly coupled to the first filter that outputs a first treated water stream;
    a second fluid flow pathway fluidly coupled to the first treated water outlet and comprising a metal salt inlet for introducing a second metal salt to the second pathway, a second ozone inlet, and a second reactor;
    a second moving bed reactive sand filter fluidly coupled to the second fluid flow pathway;
    a second treated water outlet fluidly coupled to the second filter that outputs a second treated water stream comprising treated water suitable for reuse; and
    a first reject stream outlet fluidly coupled to the first filter, and a second reject stream outlet fluidly coupled to the second filter.

2. The system of claim 1, wherein the first metal salt comprises iron salt aluminum salt, calcium salt, magnesium salt, manganese salt zinc salt copper salt or a combination thereof.

3. The system of claim 2, wherein the first metal salt comprises iron salt, calcium salt, or a combination thereof.

4. The system of claim 1, wherein the first fluid flow pathway further comprises an ozone inlet.

5. The system of claim 1, wherein the first fluid flow pathway further comprises an organic carbon compound inlet.

6. The system of claim 1, wherein the first reactor is a reactor that agitates a fluid in the first fluid flow pathway, generates or increases turbulence within the fluid, or a combination thereof.

7. The system of claim 1, further comprising a solids separator fluidly coupled to the first reject stream outlet, the solids separator comprising a settling basin, mesh filter, membrane filter, cloth filter, sand filter, rotating mat filter, chemical coagulator, polymer addition, centrifugal force separator, sieve, magnetic separator, plate clarifier, basin clarifier, coalescence separator or a combination thereof.

8. The system of claim 7, wherein the solids separator further comprises a recycled water outlet and a solids outlet, and the solids outlet outputs a solid suitable for recycling or application to agricultural, silvicultural, residential, commercial, or municipal land or horticultural soil containers.

9. The system of claim 1, further comprising an energy generator, the energy generator generating energy by biomass pyrolysis, the biomass pyrolysis producing biochar suitable for use in the system.

10. The system of claim 1, comprising:
    the first fluid flow pathway comprising the wastewater inlet, the first inlet for the biochar/metal salt mixture, a second inlet for ozone, and the first reactor downstream of the first and second inlets, the first reactor being a plug flow reactor;
    the first moving bed reactive sand filter;
    the first treated water outlet;
    the first reject stream outlet; and
    a solids separator fluidly coupled to the first reject stream outlet, the solids separator comprising a recycled water outlet and a solids outlet.

11. The system of claim 1, wherein the second metal salt comprises iron salt aluminum salt, calcium salt, magnesium salt, manganese salt, zinc salt, copper salt or a combination thereof.

12. A method for producing treated water suitable for reuse, comprising:
    adding a mixture comprising a first metal salt and biochar to a wastewater stream, the wastewater stream comprising at least one contaminant;
    allowing the wastewater stream to mix with the first metal salt/biochar mixture in a first reactor;
    flowing the wastewater stream from the first reactor to a first moving sand bed filter to separate the biochar and at least one contaminant from the wastewater stream in the first moving sand bed filter to produce a first treated water stream, and a first reject stream comprising a biochar product suitable for recycling or application to agricultural, silvicultural, residential, commercial, or municipal land or horticultural soil containers;
    adding a mixture comprising a second metal salt and biochar to the first treated water stream to form a treated water stream/metal salt mixture;
    allowing the first treated water stream to mix with the second metal salt/biochar mixture in a second reactor; and
    flowing the first treated water stream from the second reactor to a second moving sand bed filter to produce a second treated water stream comprising treated water suitable for reuse, and a second reject stream.

13. The method of claim 12, wherein adding biochar to the wastewater stream comprises adding an amount of biochar of from 1 milligram to 2 grams per gallon of wastewater.

14. The method of claim 12, wherein adding the second metal salt to the wastewater stream comprises adding an amount of the second metal salt of from greater than zero to 100 milligrams of the second metal salt per liter of wastewater.

15. The method of claim 12, wherein the first metal salt comprises iron salt, aluminum salt, calcium salt, magnesium salt, manganese salt, zinc salt, copper salt or a combination thereof.

16. The method of claim 12, wherein the first metal salt comprises ferric chloride, ferrous chloride, ferric sulfate, ferrous sulfate, aluminum chloride, aluminum sulfate, aluminum hydroxide, potassium aluminum sulfate, or a combination thereof.

17. The method of claim 12, further comprising adding ozone to the wastewater stream.

18. The method of claim 12, further comprising adding an organic carbon compound to the wastewater stream.

19. The method of claim 18, wherein the organic carbon compound comprises methanol, ethanol, ethylene glycol, glycerol, acetate, glycerin, glucose, galactose, maltose, fructose, hydroxyethyl cellulose, hydroxypropyl cellulose, carboxymethyl cellulose or a combination thereof.

20. The method of claim 12, further comprising separating the first and second reject streams into a first and second recycled water streams and a first and second solid by-products using a solids separator, the solids separator comprising a settling basin, mesh filter, membrane filter, cloth filter, sand filter, rotating mat filter, chemical coagulator, polymer addition, centrifugal force separator, sieve, magnetic separator, plate clarifier, basin clarifier, coalescence separator or a combination thereof.

21. The method of claim 12, further comprising:
testing the wastewater stream to determine an amount of the at least one contaminant present in the wastewater stream; and
adjusting a rate of addition and/or an amount of addition of the mixture of biochar and the first metal salt commensurate with the changes in the amount of the at least one contaminant present in the wastewater stream.

22. The method of claim 12, comprising:
adding the mixture of biochar and the first metal salt to a wastewater stream, the wastewater stream comprising at least one contaminant, and the first metal salt comprising a iron salt;
adding the iron salt to the wastewater stream;
adding ozone to the wastewater stream;
mixing the biochar/first metal salt mixture, the iron salt and the ozone with the wastewater stream in the reactor, the first reactor being a plug flow reactor;
filtering the wastewater stream in the first moving bed reactive sand filter to produce the first treated water stream and the first reject stream, the first reject stream comprising solids;
removing the solids from the first reject stream to produce a recycled water stream and a solid product; and
formulating the solid product.

23. The method of claim 12, wherein the first metal salt comprises iron salt, calcium salt, or a combination thereof.

24. A method, comprising:
pyrolyzing a biomass to produce biochar and heat, steam and/or syngas;
generating electrical energy from the heat, steam and/or syngas;
at least partially powering a wastewater treatment system from the electrical energy, the wastewater treatment system comprising a first fluid flow pathway, comprising a wastewater inlet for introducing a wastewater stream to the first pathway, a first biochar/metal salt inlet, a first ozone inlet and a plug flow reactor; a first moving bed reactive sand filter downstream of the plug flow reactor and the first biochar/metal salt inlet, the first moving bed reactive sand filter fluidly coupled to the first fluid flow pathway; a first treated water outlet fluidly coupled to the first moving bed reactive sand filter; a first reject stream outlet fluidly coupled to the first moving bed reactive sand filter; and a solids separator fluidly coupled to the first reject stream outlet;
introducing a wastewater stream comprising at least one contaminant to the wastewater treatment system;
adding a first mixture comprising the biochar and a calcium salt or an iron salt to the wastewater stream;
adding an additional iron salt to the wastewater stream;
adding ozone to the wastewater stream;
mixing the first mixture, the additional iron salt and the ozone with the wastewater stream in the plug flow reactor;
filtering the wastewater stream in the first moving bed reactive sand filter to produce the first treated water stream and a first reject stream comprising solids;
removing the solids from the first reject stream to produce a recycled water stream and a solid product;
introducing the first treated water stream into a second fluid flow pathway, the second fluid flow pathway comprising a second biochar/metal salt inlet, a second ozone inlet, and a second reactor; adding a second metal salt and additional ozone to the first treated water stream;
mixing the first treated water stream, the second metal salt and the additional ozone in the second reactor to form a second mixture;
flowing the second mixture into a second moving sand bed filter to produce a second treated water stream comprising treated water suitable for reuse, and a second reject stream; and
formulating the solid product into a form suitable for application to agricultural, silvicultural, residential, commercial, or municipal land or horticultural soil containers.

* * * * *